Jan. 20, 1953   J. L. ATWOOD ET AL   2,626,115
AIRCRAFT CONTROLS
Filed June 7, 1951   7 Sheets-Sheet 1

Fig. 1

INVENTORS
JOHN L. ATWOOD
CARROLL G. GORDON
BY William R. Lane
ATTORNEY

Jan. 20, 1953    J. L. ATWOOD ET AL    2,626,115
AIRCRAFT CONTROLS

Filed June 7, 1951    7 Sheets-Sheet 4

*INVENTORS*
JOHN L. ATWOOD
CARROLL G. GORDON
BY
*William R. Lane*
ATTORNEY Jan. 20, 1953  J. L. ATWOOD ET AL  2,626,115
AIRCRAFT CONTROLS Filed June 7, 1951  7 Sheets-Sheet 5

INVENTORS
JOHN L. ATWOOD
CARROLL G. GORDON
BY William L. Lane
ATTORNEY

Jan. 20, 1953 J. L. ATWOOD ET AL 2,626,115
AIRCRAFT CONTROLS

Filed June 7, 1951 7 Sheets-Sheet 7

INVENTORS
JOHN L. ATWOOD
CARROLL G. GORDON
BY
*William R. Lane*
ATTORNEY

Patented Jan. 20, 1953

2,626,115

UNITED STATES PATENT OFFICE 2,626,115

AIRCRAFT CONTROLS

John L. Atwood, Los Angeles, and Carroll G. Gordon, Pasadena, Calif., assignors to North American Aviation, Inc.

Application June 7, 1951, Serial No. 230,320

7 Claims. (Cl. 244—77)

This invention includes modifications and improvements in the gust detecting and alleviating systems for aircraft disclosed in application Serial No. 664,044, filed April 24, 1946 for Aircraft Control, in the name of John L. Atwood et al.

The invention in those applications materially reduces or eliminates accelerations caused by gusts in a direction normal to the path of travel of the airplane, and the mechanism shown and described therein changes the aerodynamic attitude of the airplane or its aerodynamic characteristics so that air disturbances which would ordinarily project an airplane vertically from its path of flight are substantially eliminated.

Accordingly, it is an object of this invention to provide modified arrangements for obtaining the invention of those applications.

It is another object of this invention to provide modified arrangements for changing the wing-lift characteristics of the airplane to obtain the new results of the invention.

It is another object of this invention to provide an electrical arrangement for operating the wing-lift-characteristic-changing means in response to detected gusts.

It is still another object of this invention to provide an arrangement which, in effect, anticipates changes in gust effects and modifies the operation of the wing-lift-characteristic-changing means accordingly.

It is a further object of this invention to provide a follow-up arrangement which modifies the operation of the wing-lift-characteristic-changing means to prevent overcontrol of the same.

Other objects of invention will become apparent from the following description taken in connection with the accompanying drawings, in which.

Figure 1:
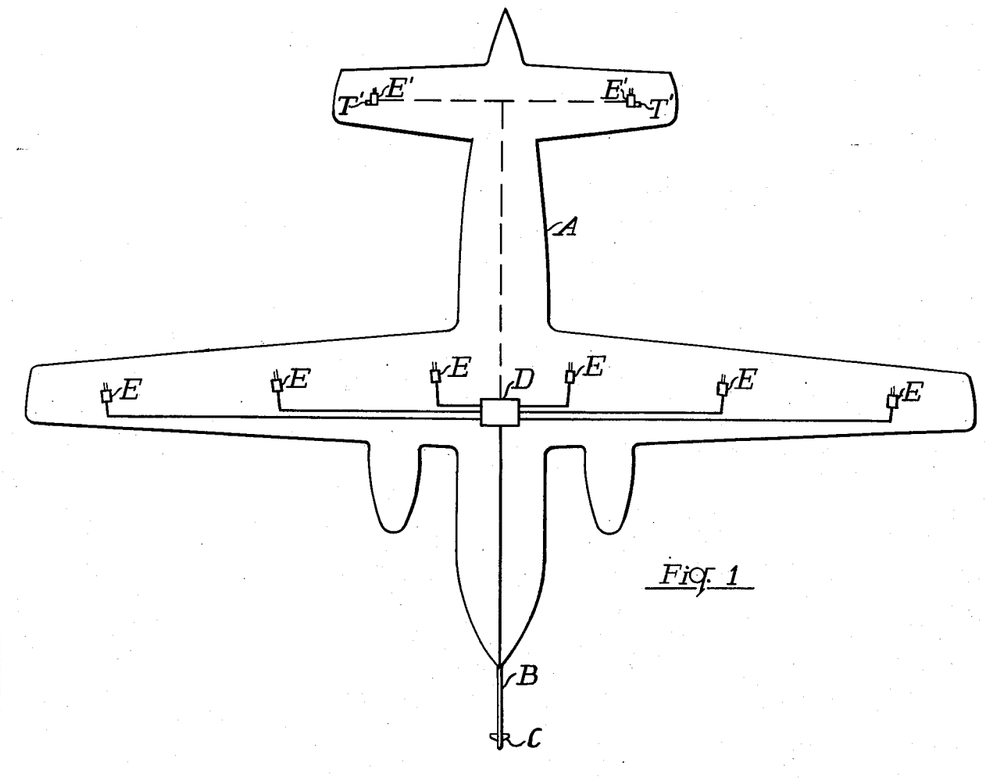
Fig. 1 is a top plan view of an airplane showing a schematic arrangement of the invention applied thereto.

Referring to the drawings, Fig. 1 shows an airplane A provided with a mast B for carrying a gust detector C operatively connected to a central control arrangement D which in turn is operatively connected to a plurality of units E and, in an alternative arrangement, may also be connected to control units E'.

Figure 1A:
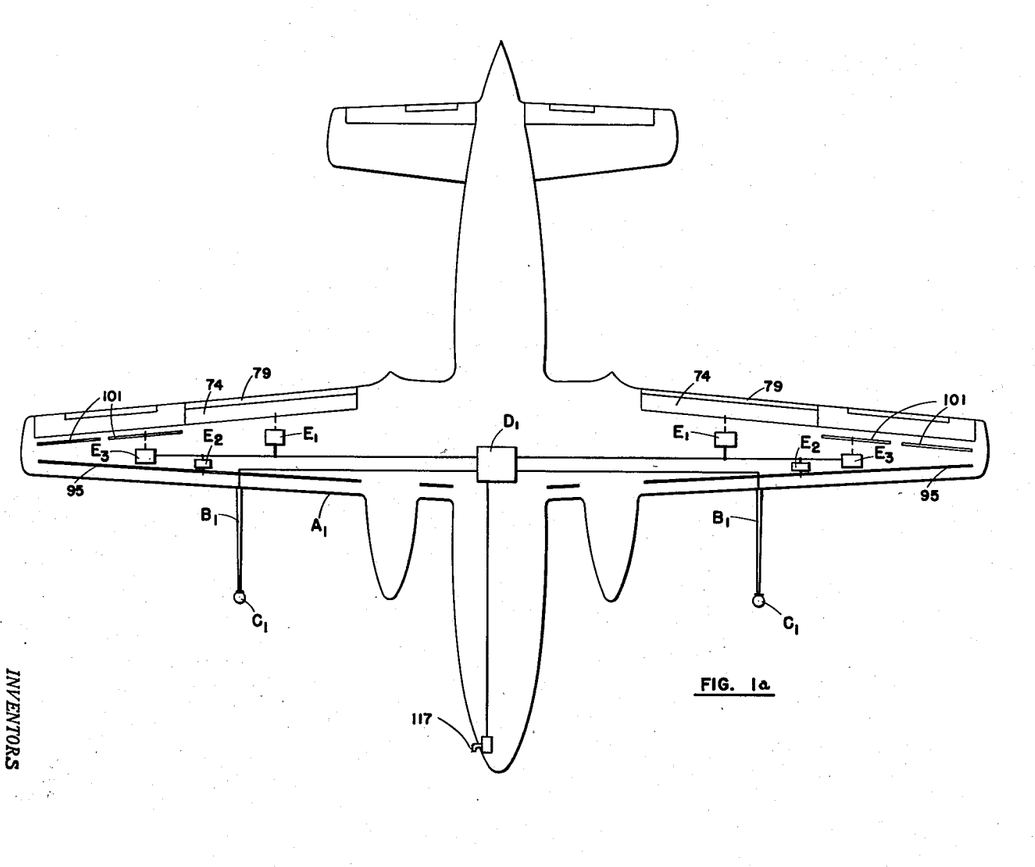
Fig. 1a is a plan view of an airplane having a modified form of the invention incorporated therein.

Fig. 1a of the drawings shows schematically an arrangement similar to Fig. 1 in which there is provided an airplane having a basic wing $A_1$ provided with one or more masts $B_1$, each carrying a gust detector $C_1$ operatively connected to a central control arrangement $D_1$ which in turn is operatively connected to one or more of the pairs of actuating units $E_1$, $E_2$, or $E_3$. The actuating units $E_1$ comprise a motor arrangement for driving a control tab, diagrammatically illustrated in Fig. 2 of the drawings, whereas $E_2$ is a boundary layer control arrangement illustrated in Fig. 5, and $E_3$ is a spoiler arrangement illustrated in Fig. 6.

Referring to the form of the invention illustrated in Figs. 1 and 7-13, there is provided a single vane 2b, pivotally attached to mast B by means of a shaft 20 suitably supported and retained in anti-friction bearings 21. This fin or vane is provided with a dashpot arrangement of ordinary construction comprising members 23 composed of cylinders adapted to receive pistons which in turn are pivotally attached to arm 22. Line 18 supplies fluid from reservoir 19 to interconnect the piston and cylinder arrangements 23. The use of a single vane permits a pitot tube arrangement comprising a sealed casing 24 provided interiorly of casing 1b and containing a pressure-responsive bellows 25 operatively connected by linkage 26, 27, and 28 to the core 29 of a potentiometer unit, the casing 30 of which is suitably attached to casing 24. Linkage 26 is pivotally supported at 36 on bracket 37 which in turn is suitably attached to casing 30. Bellows 25 is operatively connected by tube 31 to an inlet 32 in the lower front part of the vane, while inlet 33 in the upper front part of the vane is connected by tube 34 to the interior of casing 24. While vane 1b follows and is responsive to gradual changes in the attitude of the airplane, openings 32 and 33 serve to measure any gust encountered by the vane, both in direction and amount. The potentiometer unit which operates in response to the difference in the pressure between openings 32 and 33 is operatively connected by means of wires, shown generally, to actuating means for causing operation of the airplane controls. This arrangement, by provision of a single damped vane, is especially adapted to highspeed aircraft and avoids any flutter problem which may be encountered in connection with a freely floating vane. It is understood, of course, that the openings 32 and 33 of the pitot tube arrangement could be provided on a fixed portion of the forward part of the airplane.

Figures 7, 9:
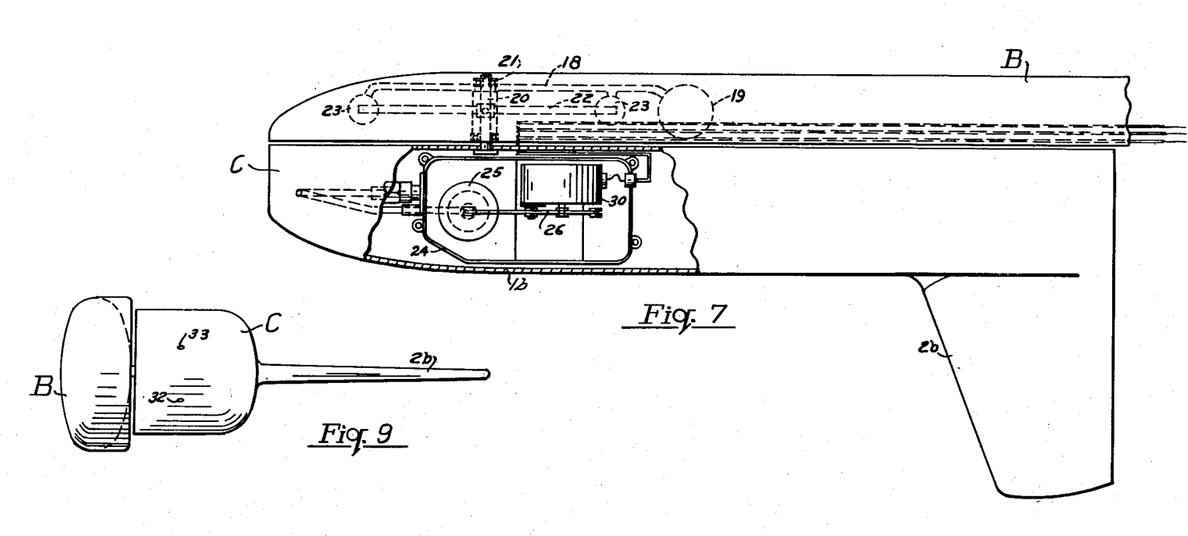
Fig. 7 is a top plan view, partly in section, of a modified detector of the null-seeking type.
Fig. 9 is a front elevational view of Fig. 7.
Figure 8:
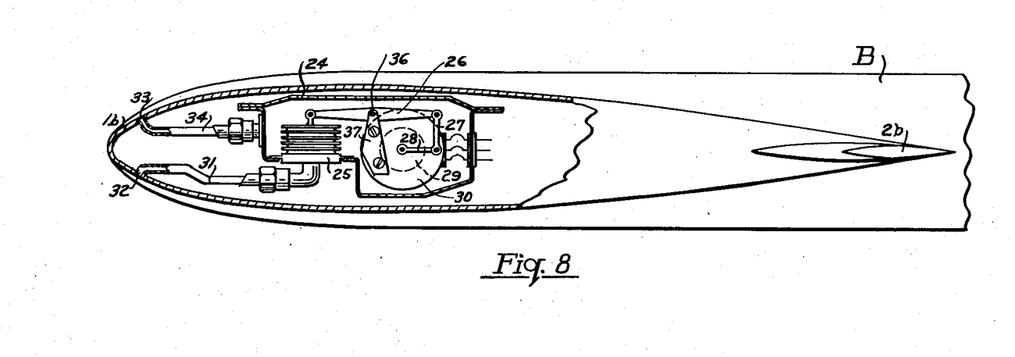
Fig. 8 is a side elevational view, partly in section, of the detector illustrated in Fig. 7.

The sniffer detector illustrated in Figs. 7, 8, and 9, is of the null-seeking type in that it responds to gradual changes in attitude of the airplane or prevailing winds. By null-seeking type is meant that the detector, as a whole, seeks a null position in which the forces thereon are balanced. In other words, the detector seeks a null position where torques created by air force acting on opposite sides thereof are equal.

In the operation of the arrangement shown in Figs. 7, 8, and 9, as long as the pressure on openings 32 and 33 is equal, the flap and related control equipment will remain neutral. Upon encountering a gust, the sudden change in angle of attack results in an increase or decrease in the pressure at one orifice with respect to the other, causing movement of the bellows or other pressure sensitive means. This will in turn cause a change in position of the core of the potentiometer unit, which in turn will result in actuation of the flap mechanism for changing the attitude of the airplane.

Figure 2:
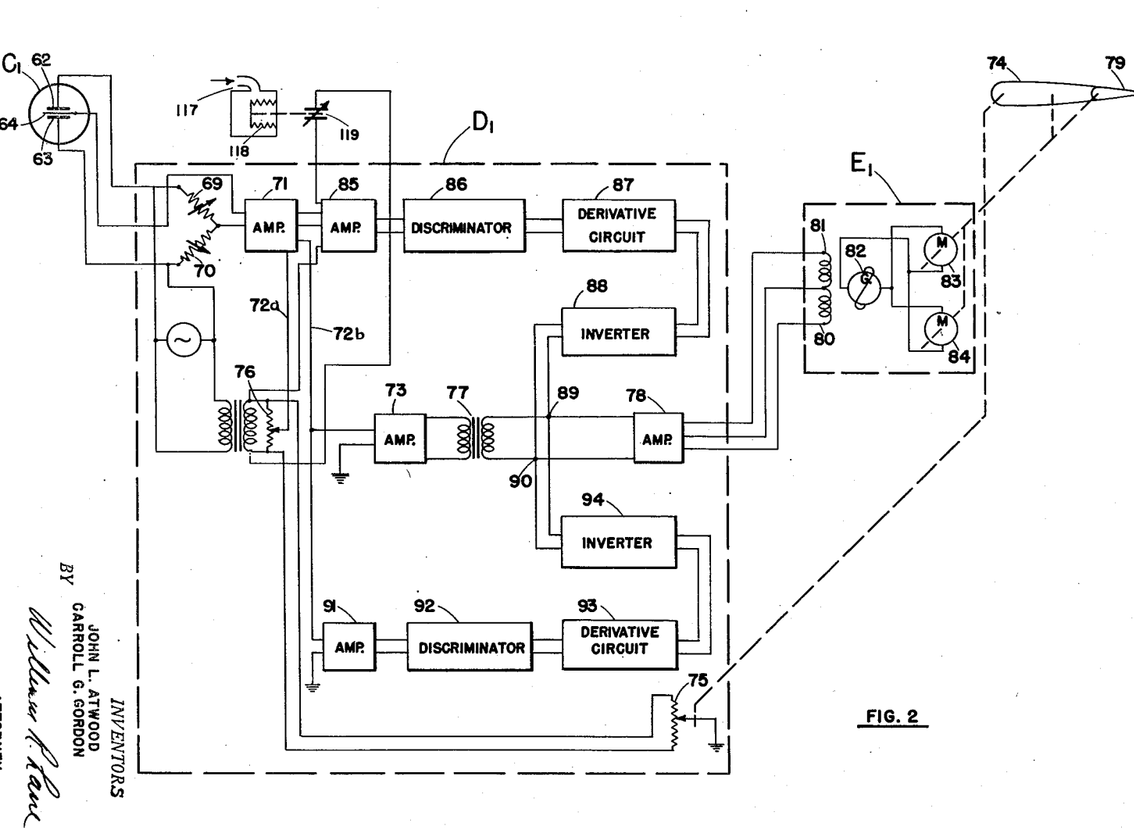
Fig. 2 is a schematic arrangement of the invention showing by way of block diagram an electrical system for carrying out the invention.
Figures 10, 11, 12, 13:
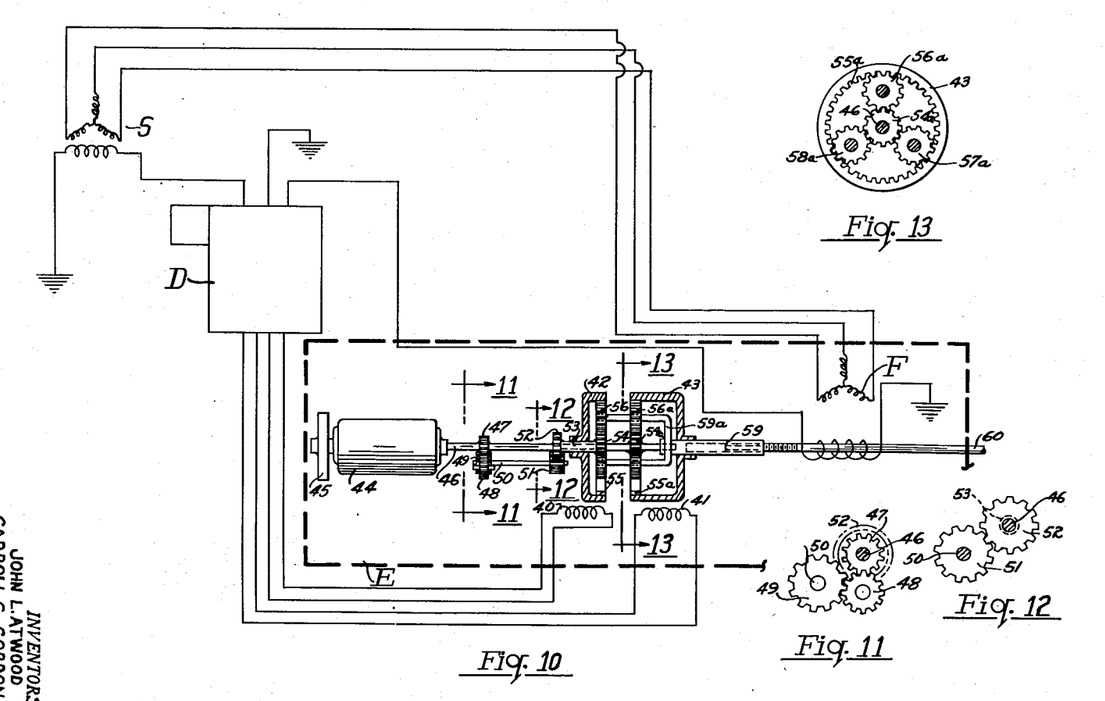
Fig. 10 is a diagrammatic arrangement with certain parts shown in detail of a system for effecting the invention.
Fig. 11 is a view taken along the line 11—11 of Fig. 10.
Fig. 12 is a view taken along the line 12—12 of Fig. 10.
Fig. 13 is a view taken along the line 13—13 of Fig. 10.

Mechanism for actuating the flap will now be described:

Referring to Fig. 10, electrical impulses or signals are transmitted from potentiometer unit S to control transmitter D containing, in a manner well known in the art, tubes and other electrical and electronic devices for amplifying or stepping up the amperage from the potentiometer circuit. Electrically connected to the control transmitter, to be operated thereby, are a pair of electric brakes 40 and 41 operatively associated with housing members 42 and 43 of a planetary gearing system. Such system is adapted to be driven by constant speed motor 44 having a fly wheel 45 associated therewith and a shaft 46 driven thereby. The electric brakes comprise a conventional arrangement such as a solenoid actuated by a coil for the purpose of engaging the members 42 and 43 for holding the same against rotation when desired. These arrangements are conventional, may be purchased on the open market, and are shown schematically in the drawings. The follow-ups indicated at F in Fig. 10, and at 75 in Fig. 2 are also considered well known to persons skilled in this field. See for example the reference in The Electronic Control Handbook by Ralph B. Batcher and William Moulic, copyrighted 1946 by Caldwell-Clemens, Inc. of New York, page 237, Fig. 6-IV of the section on Synchros and Servo Systems. See also, Fig. 12-IV, page 241. Systems of this sort are available as commercial items from numerous sources. Typical are the General Electric Corporation (Selsyn) and the Pioneer Instrument Company (Autosyn). Fixed to shaft 46 is a gear 47 adapted to mesh with idler gear 48 which in turn meshes with gear 49 integral with shaft 50. Rigidly secured to shaft 50 is a gear 51 adapted to mesh with gear 52 freely rotatably mounted on shaft 46 and provided with an integral sleeve or hollow shaft 53 to which is attached a gear 54. Housing 42 is freely rotatable on hollow shaft 53 and is provided with teeth 55 adapted to mesh with gears 56, 57, and 58 which in turn mesh with gear 54. Rigidly attached to shaft 46 is a gear 54a adapted to mesh with gears 56a, 57a, and 58a which in turn mesh with teeth 55a on housing 43, freely rotatable on shaft 59, in an arrangement identical with the housing 42 having teeth 55 thereon adapted to mesh with gears 56, 57, and 58. Gears 56, 56a, 57, 57a, 58, and 58a are rotatably mounted on member 59a integral with shaft 59 which in turn is screwthreaded to flap-actuating shaft 60. Operatively associated with shaft 60 is a follow-up unit referred to generally as F, adapted to feed back to the potentiometer unit and the control unit when the shaft 60 has moved an amount called for by those units. In the operation of the device in Fig. 10, potentiometer unit S transmits the gust signals picked up by C to the control transmitter D which in turn operates brakes 40 and 41. The transmitter also responds to operation of the follow-up system F to cause the gust flap to take the new position called for by the gust detector. The constant speed motor 44 is adapted to drive the planetary system at a constant rate and, as long as neither of the housings 42 or 43 are retarded in their movement, shaft 60 remains in a constant position. In response to impulses from the potentiometer unit, the transmitter D may cause retarding of one or the other of housings 42 or 43, resulting in a rotation of the shaft 59 moving shaft 60 to an extended or retracted position, depending upon which of the housings is retarded.

Referring now to the form of the invention illustrated in Figs. 1a, 2, 3, 4, 5, 6, 14, 15, 16, and 17, there is shown an airplane provided with a basic wing $A_1$, one or more detectors $C_1$ which may be supported by a mast $B_1$ in a suitable position with respect to the airplane wing to properly detect possible gust effects. An arrangement $D_1$ for receiving information by way of signals or otherwise from $C_1$, properly evaluating the same, and causing one or more actuating units shown in pairs $E_1$, $E_2$, or $E_3$ to change the wing-lift characteristics of the airplane so as to avoid any vertical accelerations which might have resulted from the gusts detected by $C_1$.

Figures 3, 4:
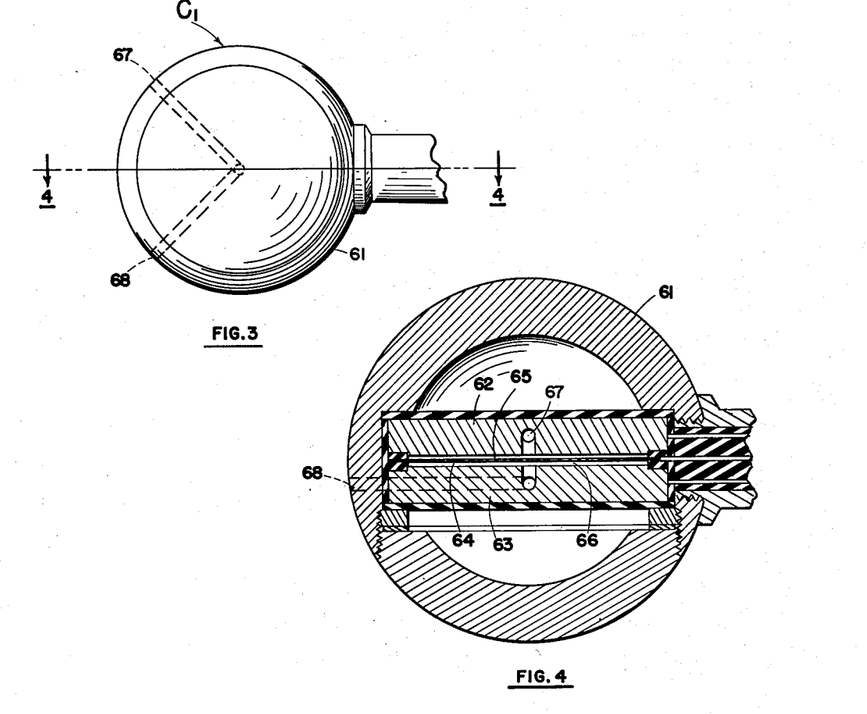
Fig. 3 is an elevational view of a sniffer detector arrangement.
Fig. 4 is an enlarged sectional view along the line 4—4 of Fig. 3.

The form of sniffer detector illustrated in Figs. 3 and 4 may be termed the fixed pressure type. Referring now to the details of this embodiment of the invention there is illustrated in Figs. 3 and 4 a sniffer detector of the Prandtl type referred to generally as $C_1$. This detector is formed of a casing 61 having therein a pair of condenser plates 62 and 63 and diaphragm 64 defining, with the plates 62 and 63, a pair of chambers 65 and 66. The detector is further provided with a pair of ports 67 and 68 connecting, respectively, with the chambers 65 and 66 for the purpose of transmitting thereto pressure differences on the detector as a result of components of gusts encountered thereby. The diaphragm 64 moves in response to the difference in pressure in the respective chambers 65 and 66 to thereby change the capacitance between it and the respective condenser plates. This change in capacitance results in a change in the voltage in the electrical bridge composed of condenser plates 62 and 63 and elements 69 and 70. This change in voltage which is responsive to the position of the diaphragm 64 results in what may be termed a gust signal. The gust signal is amplified at 71 and fed by connection 72b to a second amplifier 73. However, the gust signal is modified by a signal resulting from the position of the wing-lift-characteristic-changing means such as the flap 74 illustrated in Fig. 2. The position of flap 74 is indicated by a potentiometer 75, the signal from which is transmitted through a balancing potentiometer indicated generally at 76. The lead 72a from the balancing potentiometer connects within the amplifier 71 with the lead 72b so that the signal from 76 and that fed into 71 are mixed to form what may be termed an error signal. The error signal is defined as being indicative of the difference between the position where the wing-lift-characteristic-changing means, such as the flap 74, is, and the position where it should be to overcome any gust effects that may be measured by detector $C_1$.

The error signal is amplified at 73 and applied through a coupling transformer 77, for the purpose of better matching impedances, to an amplifier 78, and thence to field coils 80 and 81 for operating an Amplidyne generator 82 to in turn operate servomotors 83 and 84 for driving tab 79. Tab 79 in turn operates flap 74. The series compensated generator 82 has an output field in series with the armature windings of the D. C. motors 83 and 84, which in turn have separately excited fields.

The operation of the Amplidyne generator is modified by a circuit which in effect anticipates changing gust effects both in magnitude and direction. To accomplish this result the gust signal from 71 is fed to amplifier 85 and then to discriminator 86 which eliminates the carrier frequency, and from there is fed to 87 where it is differentiated to obtain the derivative thereof for purposes of determining the direction and magnitude of change of the gust signal. It has been found that the gusts to a certain extent follow predictable patterns which may be plotted in curve form, and that by obtaining the first derivative of the curve the gust can, to a certain extent, be anticipated. Accordingly, the derivative of the slope of the curve representing predetermined gust patterns is then applied through an inverter 88, for reversing the phase of the signal, and connected at 89 and 90 to the circuit from 77 to amplifier 78 for modifying the error signal applied to 78. As a result, the error signal from 73 has applied thereto a correction factor which will cause the flap 74 to be positioned upwardly or downwardly so as to anticipate the changing effect of the gust.

The effect of the changing position of flap 74 is also anticipated by feeding the error signal from 72b to amplifier 91, and from there to discriminator 92, which eliminates the carrier frequency. The resulting signal is differentiated at 93 to obtain the anticipated change resulting from the position of flap 74 in a manner similar to derivative circuit 87. The resulting signal is applied through inverter 94 and connected into the Amplidyne circuit at 89 and 90 for further modifying the error signal so that the operation of the Amplidyne generator is modified to take into account the movement of the flap in correcting for the error signal.

Figure 5:
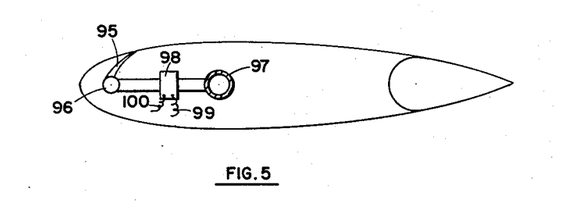
Fig. 5 is a modified form of the invention in which boundary layer control is utilized for accomplishing the invention.

In a further modified form of the invention the wing-lift-characteristic-changing means may comprise a boundary layer control arrangement, as illustrated in Fig. 5, composed of a slot 95 fed through manifold 96 from air supply 97 and controlled by throttling valve 98. The operation of the throttling valve 98 is governed by the output amplifier 78 of Fig. 2 to which it may be connected by wires 99 and 100.

Figure 6:
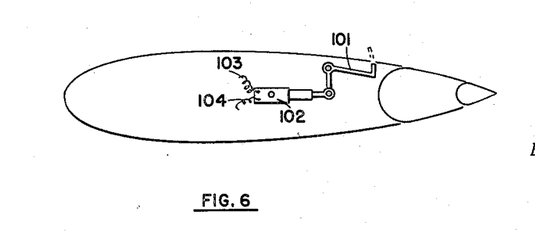
Fig. 6 is another modified form of the invention showing the use of spoilers for changing the wing-lift characteristics of the airplane.

A still further modification of the wing-lift-characteristic-changing means is illustrated in Fig. 6 and comprises spoiler means 101 operated by actuator 102 which in turn may be connected by wires 103 and 104 to output amplifier 78.

Valve 98 and actuator 102, each include a motor of the two-phase induction type in which one end of each of the two windings is connected to ground. These motors are connected to the amplifier 78 in unbalanced phase by way of pairs of lead wires 99 and 100 or 103 and 104 in lieu of the balanced three-wire arrangement illustrated in Fig. 2 for connecting the Amplidyne control to amplifier 78. Where valve 98 and actuator 102 are connected to amplifier 78 an amplifier is selected that will provide an alternating current output whose frequency is that of the control system and whose phase and amplitude are related to the direction and magnitude of the error signal. Such an amplifier is commercially available and is of the type offered for sale by Industrial Control Company, model No. 423A, advertised on page 260 of the June 1952 Electronics Buyers Guide, published by McGraw-Hill, 330 West Forty-second Street, New York.

Figure 14:
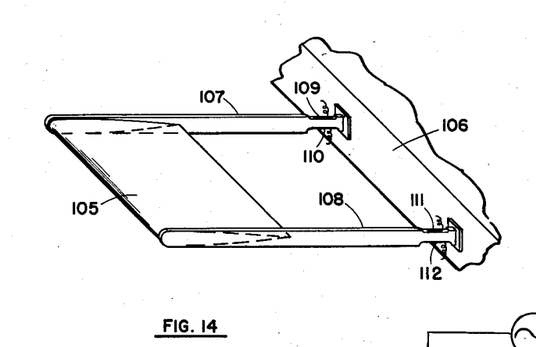
Fig. 14 is a perspective view of another modified form of a feeler.
Figure 15:
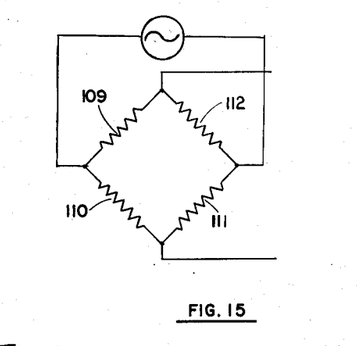
Fig. 15 is an electrical bridge used in connection with the showing in Fig. 14.

Referring now to Figs. 14 and 15 there is shown a vane 105 fixed to the forward part of wing or fuselage 106 by booms 107 and 108. These booms have applied thereto at the tops and bottoms thereof electric strain gauges 109, 110, 111, and 112, connected in the form of a bridge as illustrated in Fig. 15 for transmitting into the amplifier 71, for instance, of the system $D_1$ signals resulting from gust effects on the fixed vane 105.

Figure 16:
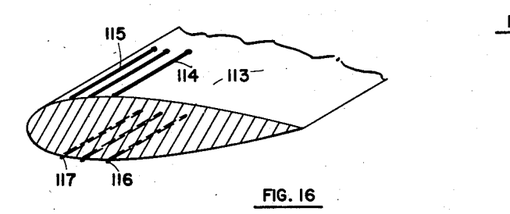
Fig. 16 is yet another modified form of the invention.
Figure 17:
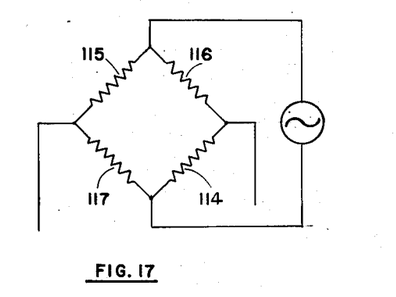
Fig. 17 is a plan view of an electrical bridge arrangement used in connection with the showing in Fig. 16.

In the form of the invention illustrated in Fig. 16 the wing or any faired surface 113 is provided with a plurality of wires 114, 115, 116, and 117, interconnected in the form of a bridge, as illustrated in Fig. 17. These wires carry electric current and may be termed "hot" wires. Gusts have different cooling effects upon these wires in accordance with the direction and magnitude of the gust. Accordingly, the output of the bridge is modified by the changes in the gusts, this output being fed to amplifier 71 of system $D_1$ in a manner similar to that described in Figs. 14 and 15.

The form of the invention illustrated in Fig. 15 operates on the basis of a change in resistance rather than a change in capacitance by having bridge elements 109, 110, 111, and 112 replace, respectively, condenser 62, resistors 69 and 70, and condenser 63. The arrangement in Fig. 17 is similar to that in Fig. 15 by having bridge elements 114, 117, 116, and 115, replace, respectively, resistor 70, condenser 63, resistor 69, and condenser 62.

The null-seeking type of sniffer, such as illustrated in Fig. 7, automatically accommodates for changed attitudes of the airplane. This enables the airplane to operate efficiently by allowing the control surface to be in a position of minimum drag. However, when a fixed type sniffer is used, such as the pitot tube arrangement on booms extending from the leading edge of the wing, or where the sniffer is located on the fuselage in front of the wings or on the leading edge of the wings themselves, it is desirable to provide a factor which takes into account the changed attitude of the airplane at the different speeds thereof so that the airplane can be trimmed with the control surface at the position of minimum drag. Accordingly, the signal to the operating mechanism for changing the wing-lift characteristics of the airplane must be modified by an arrangement responsive to the attitude of the airplane to bring about the desired result. This result may be obtained by the use of a device for obtaining a so-called "q" signal which is responsive to the kinetic pressure of air to provide a measure of the change in the attitude of the airplane. In other words, in stable flight an airplane automatically assumes an attitude in which it is stable to support its own weight. The angle of attack will vary with the different speeds and, accordingly, the "q" value is a measure of the attitude of the airplane at different speeds in stable flight. By feeding into the circuit a signal corresponding to the "q" value, the operation of the wing-lift-characteristic-changing means is modified according to the speed and correspondingly to the attitude of the airplane. Since the operation of the sniffer varies with the attitude of the airplane the "q" signal can be used to modify the operation of the wing-lift-characteristic-changing means to properly compensate for gust effects measured on the sniffer. Thus for a relatively large angle of attack with the fixed type sniffer the vertical components would be measured at a different angle than with a smaller angle of attack of the airplane. However, the smaller angle of attack would involve a higher speed for stable flight. Accordingly, the gust signal will be necessarily modified differently for the different angles of attack and for the different speeds of the airplane so that in all instances the wing-lift-characteristic-changing means are operated by an amount necessary to nullify the effects which vertical forces would have on the airplane to project it vertically from its normal flight.

To accomplish these results there is provided, as shown in Fig. 2 of the drawings, a pitot tube head 127 having a pressure-sensitive means (bellows) 128. The bellows is operatively connected to an electrical unit 129 comprising a variable capacitance or inductance unit in such a manner that the movement of the bellows varies the capacitance or inductance of the electrical unit. The pitot tube head and bellows arrangement, together with the electrical unit, are commercially available and need not be described with further particularity. The signal from 129 is fed into amplifier 85, as shown by the wiring diagram in Fig. 2 of the drawings, and applies a corrective factor to the signal from 71 to the extent that the responsiveness of the control surface is made to vary with the varying attitude of the airplane. As a result there obtains a signal in mechanism $E_1$ which corresponds to different attitudes of the airplane so that control means 74 is operated to nullify the effect of any vertical components of gusts encountered by the airplane. As a result of this form of the invention there obtains the benefits of the null-seeking type of vane without the use of the damped vane to provide the plane of reference.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing and provided with a direction- and magnitude-sensitive part which is responsive to the vertical component of airflow relative to the airplane caused by said turbulence; means on said wing for changing the wing-lift characteristics thereof; electrical means connected to said direction- and magnitude-sensitive part and responsive thereto for generating a gust signal indicative of said vertical component of airflow; and electrical means operatively connected to said last named means and to said wing-lift-characteristic-changing means and responsive to said signal for operating said wing-lift-characteristic-changing means by an amount which substantially neutralizes any effect of changes in vertical component of air force to which the airplane would otherwise be subjected, before such changes in force become effective to shift the airplane vertically from its projected course.

2. A device as recited in claim 1 and further including means for generating a signal indicative of the position of said wing-lift-characteristic-changing means, and means operatively connected to said generating means and said wing-lift-characteristic-changing means and responsive to said signal for modifying the operation of said wing-lift-characteristic-changing means to conform the same with the said gust signal.

3. A device as recited in claim 1 and further including means for generating a signal indicative of gust changes, and means operatively connected to said generating means and said wing-lift-characteristic-changing means and responsive to said signal for modifying the operation of said wing-lift-characteristic-changing means.

4. A device as recited in claim 1 and further including follow-up means operatively connected to said wing-lift-characteristic-changing means and responsive to the operation thereof for modifying the action of said operating means to prevent over-control by said wing-lift-characteristic-changing means.

5. A device as recited in claim 1 and further including means for generating a signal in response to the attitude of said aircraft, and means operatively connected to said generating means and said second electrical means responsive to said signal for modifying the operation of said wing-lift-characteristic-changing means.

6. A device as recited in claim 1 in which said feeler comprises pitot tube means fixed to said airplane.

7. A device as recited in claim 1 in which said wing-lift-characteristic-changing means comprises a flap and a tab pivotally mounted on said flap for operating the same said gust-responsive signal means being connected to said tab.

JOHN L. ATWOOD.
CARROLL G. GORDON.

REFERENCES CITED

The following references are of record in the file of this patent:

UNITED STATES PATENTS

| Number | Name | Date |
|---|---|---|
| 2,343,288 | Fink | Mar. 7, 1944 |
| 2,368,059 | White | Jan. 23, 1945 |
| 2,420,932 | Cornelius | May 20, 1947 |
| 2,496,339 | De Giers et al. | Feb. 7, 1950 |
| 2,512,278 | Jones | June 20, 1950 |

FOREIGN PATENTS

| Number | Country | Date |
|---|---|---|
| 402,225 | Great Britain | Nov. 30, 1933 |